(12) United States Patent
Meyer et al.

(10) Patent No.: US 8,083,180 B2
(45) Date of Patent: Dec. 27, 2011

(54) AIRCRAFT LANDING GEAR

(75) Inventors: Jorg Meyer, Baienfurt (DE); Ulrich Grabherr, Opfenbach (DE); Werner Hufenbach, Dresden (DE); Olaf Helms, Dresden (DE); Ole Renner, Dresden (DE); Maik Gude, Dresden (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 770 days.

(21) Appl. No.: 12/077,226

(22) Filed: Mar. 18, 2008

(65) Prior Publication Data
US 2008/0230650 A1    Sep. 25, 2008

(30) Foreign Application Priority Data

Mar. 19, 2007  (DE) ............... 10 2007 013 037
Apr. 23, 2007  (DE) ............... 10 2007 019 052

(51) Int. Cl.
 *B64C 25/00*    (2006.01)
(52) U.S. Cl. ................. 244/100 R; 244/102 A
(58) Field of Classification Search ........... 244/100 R, 244/102 A
See application file for complete search history.

(56) References Cited

U.S. PATENT DOCUMENTS

| 4,336,868 | A  | * | 6/1982  | Wilson et al. ............. 188/376 |
| 4,408,736 | A  | * | 10/1983 | Kirschbaum et al. ...... 244/100 R |
| 5,110,068 | A  | * | 5/1992  | Grande et al. ............ 244/102 SL |
| 5,224,669 | A  | * | 7/1993  | Guimbal ..................... 244/108 |
| 5,547,148 | A  | * | 8/1996  | Del Monte et al. ...... 244/104 FP |
| 2004/0262452 | A1 | * | 12/2004 | Derrien et al. ............ 244/102 A |
| 2006/0284009 | A1 | * | 12/2006 | Kismarton ............. 244/104 LS |
| 2007/0007386 | A1 | * | 1/2007  | Coupe et al. ............. 244/102 A |
| 2007/0235585 | A1 | * | 10/2007 | Nance ....................... 244/100 R |
| 2009/0078821 | A1 | * | 3/2009  | Chow et al. ................ 244/1 N |
| 2010/0006698 | A1 | * | 1/2010  | Steinke et al. ............ 244/100 R |
| 2011/0001005 | A1 | * | 1/2011  | Cordy, Jr. ................. 244/103 R |

FOREIGN PATENT DOCUMENTS

DE  3131059  3/1982
EP  0181700  5/1986

* cited by examiner

*Primary Examiner* — Christopher P Ellis
(74) *Attorney, Agent, or Firm* — Dilworth & Barrese, LLP.

(57) ABSTRACT

The invention relates to an aircraft landing gear comprising a landing gear leg, wherein the landing gear leg or one or more parts of the landing gear leg consists partly or completely of a fiber composite material.

25 Claims, 10 Drawing Sheets

Section E-E  Section E-E

AIRCRAFT LANDING GEAR

BACKGROUND OF THE INVENTION

The invention relates to an aircraft landing gear having at least one landing gear leg.

It is in particular of essential importance in aeronautics that the technical aeronautical components are manufactured in lightweight design. Landing gear components subject to high strain have previously been produced in a metallic lightweight design which is very complex and/or expensive in part, with the lightweight potential already having been largely exhausted due to long years of development and optimization processes.

SUMMARY OF THE INVENTION

It is therefore the underlying object of the present invention to further develop an aircraft landing gear such that it has a particularly low weight, on the one hand, and satisfies mechanical structural and technical production restrictions, on the other hand.

This object is solved in that the landing gear leg or one or more parts of the landing gear leg consist/consists partly or completely of a fiber composite material.

The present invention furthermore relates to an aircraft landing gear having a landing gear leg as well as having a brace connected thereto which supports the landing gear leg in its moved out state, with the brace or one or more parts of the brace being made partly or completely of a fiber composite material. Provision is made in a preferred embodiment of the invention for the aircraft landing gear to have a landing gear leg.

Provision is made in a further embodiment of the invention for the brace to consist of at least two parts which are pivotally connected to one another and of which one is fastened to the landing gear leg and the other can be fixed to the fuselage, with the part fixable to the fuselage consisting of a fiber composite material or comprising a fiber composite material.

In a preferred embodiment of the invention, both of the weight-determining components of the aircraft landing gear, namely the landing gear leg and the upper kinked brace, are made from fiber composite material.

It is particularly advantageous when the landing gear leg and/or the brace or one or more parts of the landing gear leg and/or of the brace comprise at least two shell structures of a fiber composite material connected to one another.

Provision can furthermore be made for the landing gear leg to have at least one tube structure for the reception of a spring-damper system and/or of a thrust tube at which the axle assembly is arranged. The landing gear leg of the aircraft landing gear in accordance with the invention preferably has a tube structure which preferably has a cylindrical inner contour and which receives the thrust tube connected to the axle assembly and a spring-damper system. For this purpose, the tube structure is preferably closed at its upper end and can thereby absorb the axial forces of the spring-damper system in a shape-matched manner.

Provision is thus preferably made for a multi-shell construction to be used for at least the two structural components of landing gear leg and upper kinked brace which meets the demands of strain, material and production. Provision can be made in this context for the shell structures to be connected to the tube structure and preferably to form a hollow structure in which the tube structure is received. The landing gear leg thus preferably consists of a central tube structure and two shell structures, with the tube structure serving, as stated, to receive a thrust tube as well as a spring-damper system.

Provision is preferably made in this connection for the tube structure to be fixedly enclosed between the inner shell and the outer shell, whereby a structural unit arises with which the forces and torques introduced in the tube structure can be transmitted to the support points in a manner suitable for force flow. The support points are arranged at the shell structures or at the landing gear leg in a suitable manner. Provision is accordingly made in a further embodiment of the invention for the landing gear leg to have one or more support points by means of which the landing gear leg can be fixed to a fuselage structure of an aircraft and/or to a brace supporting the landing gear leg and/or to an actuation unit for the moving in and out of the landing gear leg.

In a further embodiment of the invention, the brace has one or more support points by means of which the brace can be fixed to a fuselage structure of an aircraft and/or to the landing gear leg. Provision can also be made for the brace to consist of a plurality of parts by means of which the parts are pivotably connected to one another. It is conceivable for the brace to consist of two parts, namely of an upper kinked brace which is pivotally connected to a fuselage structure of the aircraft and of a lower kinked brace which is pivotally connected to the upper kinked brace, with at least the upper kinked brace preferably consisting of fiber composite material.

It is particularly advantageous for the shell structures of the landing gear leg or for the brace preferably to overlap in their marginal regions while forming one or more overlap regions in areal form.

The shell structures preferably overlap over a large area and are preferably fixedly connected to one another in this overlap region. The overlap regions thus have approximately twice the wall thickness and are made as reinforcement ribs with which an unwanted deflection of the landing gear leg or of the brace in the direction of travel can be effectively prevented.

The named shell structure of the landing gear leg is preferably designed as wide and the spacing of the pivot bearings is selected as comparatively large so that forces and torques transverse to the direction of travel can be reliably transmitted to the vehicle structure.

Due to the fact that the shell structures in the overlap region have a particularly high strength or can absorb particularly high forces, the named support points are preferably arranged at least in part in the overlap region or regions.

This can apply, for example, to the bosses for the pivot bearings which are under high strain and by means of which the landing gear leg is pivotally connected to the fuselage structure of an aircraft, to the kinked brace support in which the brace structure is pivotally connected to the landing gear leg and to the connection of the actuation cylinder to the landing gear leg. The overlapping construction ensures in this connection a favorable distribution of the introduced loads onto the at least two shell structures. If the bolt connections are biased in the direction of the bolt axis, the fiber composite structure is supported in the hole region, whereby a further increase in the hole reveal strength can be produced.

If moved bolts should be received in the bosses, it may be of advantage to integrate metallic bushings, of steel or bronze for example, into the bosses.

Due to its exceptional strength, the overlap region is furthermore suitable for the positioning of further supports or components, such as example the support points for the door actuation kinematics and for the fastening of headlamps and other units.

It must be pointed out at this point that the present invention is not restricted to landing gear legs or kinked braces which consist of precisely two shell structures. Generally, more than two shell structures can also be used.

Provision is made in a further embodiment of the invention for the landing gear leg to have a steering housing or for a steering housing to be connected to the landing gear leg. It can be arranged as a separate part at the landing gear leg or can form an integral component of the landing gear leg. The steering housing required for nose landing gears can thus be produced as a separate component and can be arranged at a suitable position or can be provided as an integral component.

It is conceivable that the steering housing is fastened to a flange which forms an integral component of one of the shell structures. It is possible that the shell structures of the landing gear leg form an inner shell and an outer shell and that the flange represents an integral component of the outer shell.

The connection of the steering housing can be made in a firmly bonded manner or in a shape matched manner. Shape matching can, for example, be established by shaping elements in the installation surfaces of the flange and the housing as well as by metallic connection elements such as rivets or screws.

As already stated, the brace or parts thereof and particularly preferably the upper kinked brace can have a structure similar to the described landing gear leg of a fiber reinforced inner shell and outer shell. Both fiber composite shells are preferably fixedly connected to one another and form a stiff hollow structure. It is conceivable to design the brace as an upper and lower kinked brace which are connected to one another via a knee joint. The kinked brace arrangement has the object of supporting and locking the landing gear leg with moved out landing gear. With moved out landing gear, the kinked brace arrangement is preferably locked in the extended state and then permits a stiff support of the landing gear leg with respect to the aircraft structure.

Provision is made in a preferred embodiment of the invention for the brace or the named upper kinked brace to be pivotally connected to the aircraft structure via two pivot bearings. It is conceivable that pulling and compressive forces are introduced from the landing gear leg via a spherical bearing and are transmitted via the named pivot bearings of the brace or of the upper kinked brace to the aircraft structure. Provision can also be made here for a large support distance of the two pivot bearings of the brace to be provided, whereby a sufficient stability of the kinked brace arrangement against a lateral kinking is ensured on exposure to pressure.

As already stated above, the shell structures of the brace or of the upper kinked brace are preferably fixedly connected to one another in a large-area overlap region. The bosses under high strain for the knee joint by which the upper kinked brace is pivotally connected to a lower kinked brace as well as the bosses for the upper pivot bearing via which the brace or the upper kinked brace is pivotally connected to an aircraft structure can preferably be arranged in the thick-walled overlap region. Generally, alternatively or additionally, the lower kinked brace can consist of a fiber composite material.

Provision is made in a further embodiment of the invention for the brace or a part of the brace to have a base structure branched in Y shape in whose branches support positions are provided for the fixing of the brace to a fuselage structure of an aircraft.

It is conceivable to provide a web which extends between the branches of the base structure branched in Y shape and which has the object of avoiding a lateral escaping of the associated web branches of the Y-shaped structure. The web is integrated in a manner suitable for strain into the outer shell of the brace or of the upper kinked brace.

As stated above, the landing gear leg and/or the brace or the upper kinked brace consists completely or partly of a fiber composite material. It is conceivable to use a fiber/plastic composite having a high specific strength and stiffness as well as a low density. This is achieved, for example, in that the material consists of long or endlessly extending reinforcement fibers oriented suitable for strain. Glass fibers, aramide fibers or carbon fibers can be considered, for example. They are preferably integrated into a thermoplastic or thermosetting plastic matrix.

A layering of textile areal semi-finished products such as woven fabrics, fabrics or knitted fabrics can be considered, for example, for the design of the aforesaid shell structures for the landing gear leg or for the brace or the upper knee brace.

Distress can occur in the named overlap regions in which the two or more than two shell structures are connected to one another which are particularly unfavorable for laminate connections and adhesive connections and can result in failure of the component. It is therefore conceivable to use suitable connection elements, in particular in these regions, such as biased metallic connection elements, for example, bolts, screws or rivets for the highly firm shape matched connection of the two shell structures at least in these overlap regions. The connection elements furthermore serve the reinforcement in the thickness direction (z reinforcement). These connection elements can be arranged, for example, at the upper and lower clamping region of the central tube structure in accordance with claim 6 and/or in the region of the support points by means of which the landing gear leg and/or the brace is/are pivotally supported at a fuselage structure of an aircraft.

Provision is made in a further embodiment of the invention for at least some of the reinforcement fibers to be arranged approximately parallel to the axis of the named tube structure and/or parallel to the path or on the path between load introduction points. A fiber orientation suitable for the strain is desired. Since the landing gear leg is substantially exposed to a global bending strain, a high portion of the reinforcement fibers is to be arranged approximately parallel to the axis of the tube structure and on a short, direct path between the load introduction points. Furthermore, fibers are to be oriented at an angle of +/−45° to the longitudinal axis of the tube for the transmission of the steering torque between the steering housing and the pivot bearing.

A claimed orientation of the fibers is naturally preferably also to be carried out in the brace or in the named upper kinked brace. The individual sections of the Y-shaped kinked brace substantially transmit traction forces and compressive forces such that a high portion of the reinforcement fibers is to be arranged along the brace sections on a short and direct path between load introduction points.

It applies both to the landing gear leg and to the brace that a so-to-say isotropic layer structure is of advantage in the region of bolt connections subject to high strain to ensure a high hole reveal strength. For this purpose, the laminate can furthermore be thickened, i.e. reinforced, locally.

With bolt holes with a low spacing from the component rim, local loop arrangements can be provided by means of which endurable support forces can be increased.

Provision is made in a further embodiment of the invention, for the components of the landing gear body and/or of the brace to be joined to one another by a connection technique, in particular by adhesive bonding or riveting, or to be manufactured in a production step. The shell structures of the landing gear leg and the brace or of the upper kinked brace are preferably joined to one another in the overlap region, for example, by adhesive bonding or riveting or by another suitable connection technique.

The shell structures of the landing gear leg and/or the brace preferably arise as a layer design of assembled textile semi-finished reinforcement products, such as woven fabrics, fabrics or knitted fabrics, which are aligned and positioned suitable for strain.

The fiber reinforcement of the named tube structure of the landing gear leg preferably arises by a technical winding placement of fiber rovings or textile semi-finished products on a core which is later introduced into a molding tool.

The layer structures can be supplemented by fiber preforms suitable for strain in regions of high load concentration. It is conceivable to manufacture these preforms in a reproducible manner by technical-sewing fixing of fiber strands on a textile support material (tailored fiber placement).

As stated above, the individual shells or tubular structures of the brace or of the upper kinked brace and of the landing gear leg are produced separately from one another and are subsequently joined, for example, by means of adhesive bonding or riveting. There is alternatively the possibility of manufacturing the named structures, i.e. the brace or the landing gear leg or parts in a production process (wet-in-wet).

The present invention furthermore relates to a method for the manufacture of a landing gear leg or of one or more parts of a landing gear leg and/or of a brace or of one or more parts of a brace of an aircraft landing gear, in which this manufacturing takes place by the method of resin transfer molding. The resin transfer molding (RTM) method is in particular of special advantage for the reproducible production of the landing gear leg in accordance with the invention of the aircraft landing gear in one step (wet-in-wet). The method can be carried out such that dry, or also preconsolidated, semi-finished reinforcement products or preforms are positioned in a molding tool which is then evacuated. Finally, reaction resin is pressed into the molding tool. It is conceivable to position the dry semi-finished reinforcement products or preforms in a closed molding tool and then to evacuate the remaining air using a vacuum pump and finally to press in reaction resin at high pressure.

It is conceivable in this connection for the manufacture of the landing gear leg, first to place the tailored fiber for the inner shell on the lower tool and to adapt it to the mold surface by draping.

Subsequently, the winding core can be placed on which is positioned in the molding tool with the fiber reinforcement for the tube structure. The fiber material of the tube structure is preferably first placed on a core in a technical winding manner and the core is then inserted into the molding tool.

Cores of structured foam or cores which can be washed out are preferably placed in for the definition of the spacing of outer shells and inner shells.

Subsequently, the semi-finished reinforcement products for the outer shell are aligned in the tool.

The still dry structure is now enclosed in a vacuum-tight manner between the upper tool and the bottom tool and reaction resin is injected in for the consolidation.

To ensure a complete resin infiltration with a high fiber volume content in the tube structure, it may be necessary to carry out the resin impregnation not first in the molding tool, but before the introduction of the fiber material for the tube structures into the molding tool. It is conceivable already to carry out the resin impregnation on the technical winding placement of the reinforcement fibers on the core. In this case, the tube structure is then placed into the RTM tool in a pre-consolidated fashion.

The method can be carried out in a molding tool having an upper tool and a lower tool. It is likewise conceivable to replace the upper tool by a vacuum foil. It is thus also possible, in particular for the achievement of higher fiber volume portions, to use an open tool system in which the upper tool is replaced by a vacuum foil. Both the processing of dry semi-finished fiber products with subsequent resin injection and the placement of pre-impregnated semi-finished reinforcement products (prepregs) are possible using this tool system. An increase of the fiber volume portions is, for example, possible by increasing the ambient pressure, for instance in an autoclave.

As already stated above, it is likewise possible, and is covered by the invention, to manufacture the individual structural components of the landing gear leg or of the brace or of the upper kinked brace separately and then to connect them. However, this results in an increased installation effort since the highly firm connection between the components has to be established by adhesive bonding or by bolts, for example.

The present invention furthermore relates to a landing gear leg for an aircraft landing gear, with the landing gear leg being designed in accordance with the description herein as well as to a brace for an aircraft landing gear, with the brace being designed in accordance with the description herein.

BRIEF DESCRIPTION OF THE DRAWINGS

Further details and advantages of the invention will be explained in more detail with reference to an embodiment shown in the drawing. There are shown.

DESCRIPTION OF THE PREFERRED EMBODIMENTS

Figure 1:
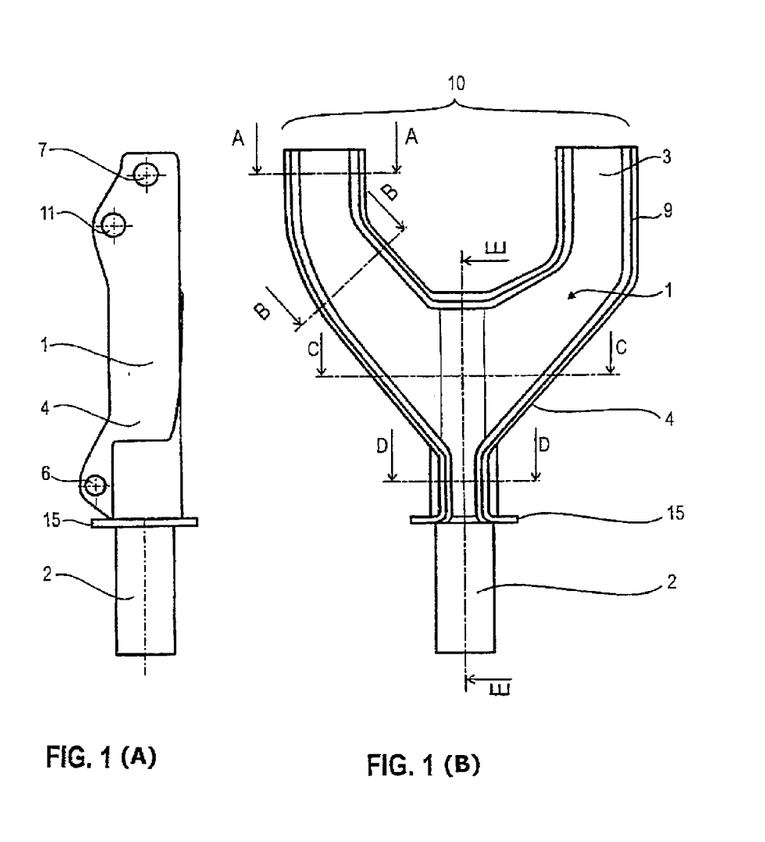
FIG. 1: a side view (left hand representation) and a frontal view (right hand representation) of the landing gear leg in accordance with the invention of fiber composite material consisting of shell components and a central tube structure.

FIG. 1, left hand representation, shows the landing gear leg in accordance with the invention (in a side view) which is manufactured from fiber composite material. The landing gear leg 1 consists of a central tube structure 2 and two shell structures 3, 4, of which reference numeral 3 marks the inner shell and reference numeral 4 marks the outer shell surrounding the inner shell 3. The shell structures 3, 4 together form a closed hollow structure which includes the tube structure 2, as can be seen from FIG. 1 and in particular from the sectional representations in accordance with FIG. 3.

FIG. 1, right hand representation, shows the arrangement in a frontal view.

The two shell structures 3, 4 are fixedly connected to one another by a large-area overlap region 9 and form a long clamped support for the tube structure 2. Bores for the reception of the pivot bearings 7 are arranged in the overlap region 9 and the landing gear leg 1 is arranged pivotally at a fuselage structure of an aircraft via them. Furthermore, bores for the kinked brace support 6 are arranged in the overlap region and the landing gear leg 1 shown is pivotally connected via them to a kinked brace which is pivotally connected at its other end region to a fuselage structure of an aircraft. Furthermore, a bore 11 is provided in the overlap region via which an actuation cylinder can be connected to the landing gear leg 1 via which the landing gear leg 1 is moved in and out.

As can furthermore be seen from FIG. 1, an installation flange 15 is integrated into the outer shell 4 as an integral component at which a steering housing can be arranged which is not shown in FIG. 1.

The same parts or functionally the same parts are shown with the same reference numerals in the Figures.

Figure 2:
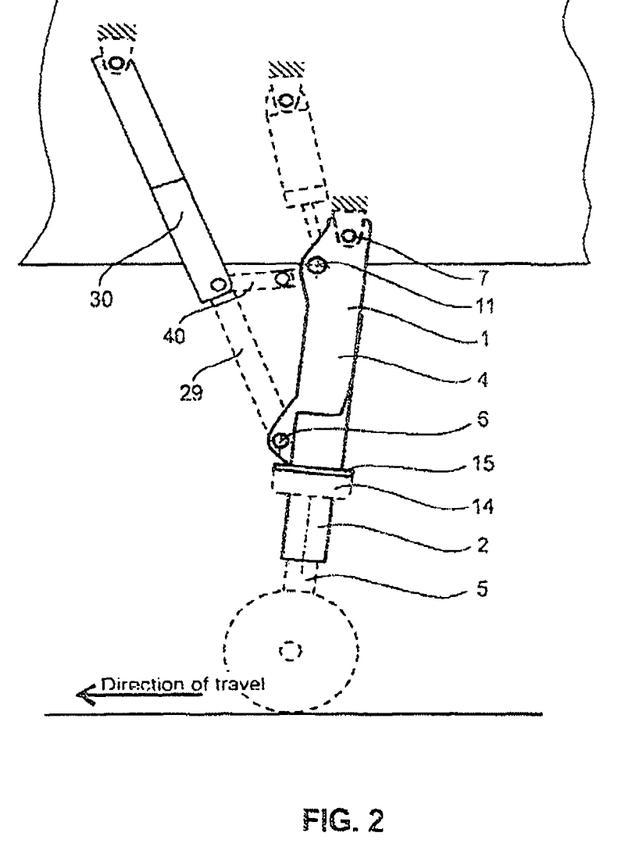
FIG. 2: a schematic representation of the landing gear leg of FIG. 1 arranged at an aircraft fuselage with a brace supporting said landing gear leg.

FIG. 2 shows in a schematic view the landing gear leg 1 of FIG. 1 as well as the kinked brace which consists of two parts, namely the part 29 (lower kinked brace) and the part 30 (upper kinked brace). The upper kinked brace 30 consists, like the landing gear leg 1, of a fiber composite material. As can furthermore be seen from FIG. 2, the brace 29, 30 serves for the stabilization or support of the landing gear leg 1 in its moved out state.

The wheel loads are introduced into the landing gear leg via the thrust tube 5 in the bow landing gear shown in FIG. 1 as with all landing gears observed. The thrust tube 5 is longitudinally displaceably received in the central tube structure 2. In the bow landing gear, the two-part kinked brace 29, 30 supports the landing gear leg 1 to the front with respect to the aircraft structure.

As already stated, the landing gear leg 1 is pivotally connected via the two pivot bearings 7 to the pivot bearing clearance 10 and the upper kinked brace 30 is pivotally connected to the aircraft structure via the two pivot bearings 31 (see FIG. 11), as can be seen from FIG. 2.

The extended kinked brace arrangement 29, 30 is locked in the moved out state via a further lever mechanism 40. The further lever arrangement 40 extends between the hinged connection between the upper and lower kinked braces 29, 30 and the pivotal connection point 11 of the actuation cylinder at the landing gear leg 1.

As can furthermore be seen from FIG. 2, a steering housing 14 is provided for steering operation for the bow landing gear shown here and is connected to a flange 15 of the outer shell 4 of the landing gear leg 1.

In FIG. 2, the parts of the landing gear consisting of a fiber composite material are shown with a dark background. The lower kinked brace 29, the named thrust tube 5 and the lever mechanism 40 locking the extended kinked brace arrangement 29, 30 consist of metal.

Figure 3:
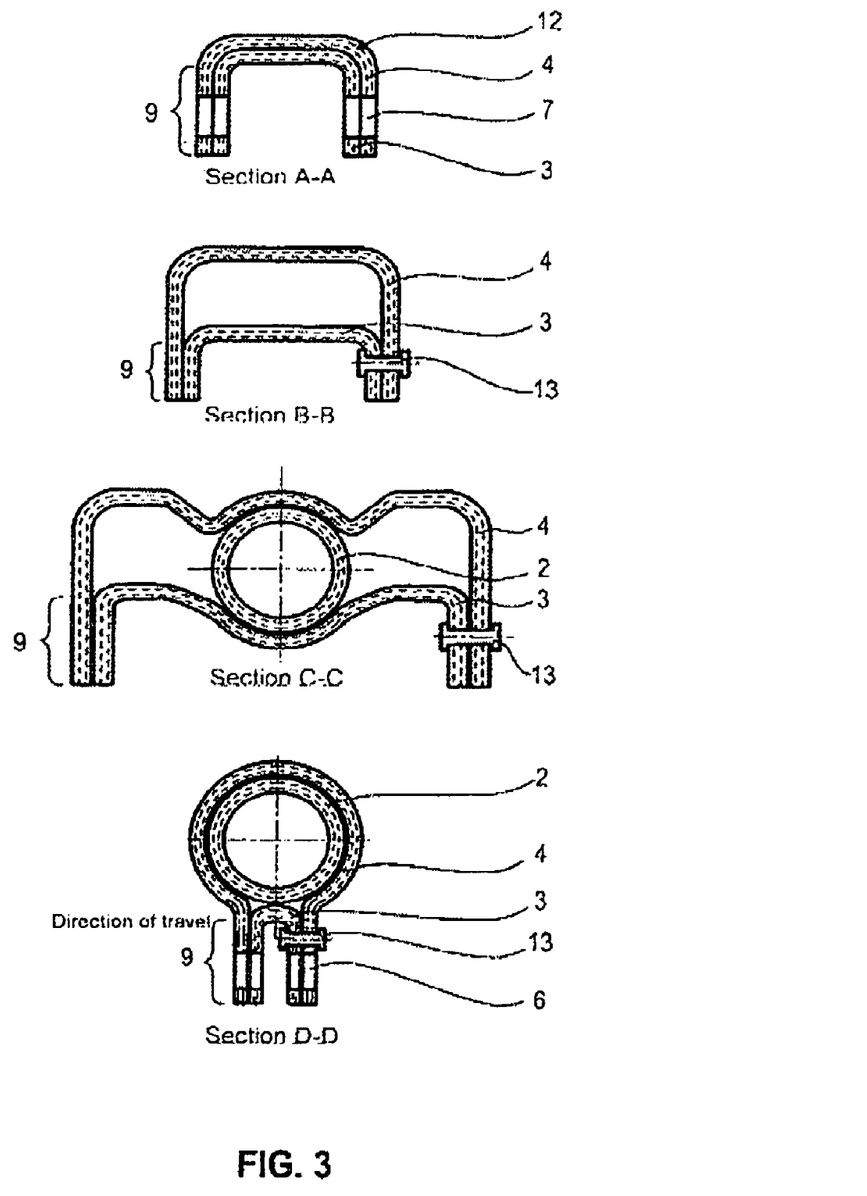
FIG. 3: cross-sectional representations through the landing gear leg of FIG. 1, right hand representation.

FIG. 3 shows sectional views in accordance with the section lines A-A, B-B, C-C and D-D in accordance with FIG. 1, right hand representation.

As can be seen from FIG. 3, overlap regions 9 are provided at all section levels and the inner structure an the outer structure, i.e. both shell structures 3, 4, contact one another areally in said overlap regions.

A double wall thickness consequently results here. The bores for all steering bearings 6, 7 under high strain are arranged in these regions.

As can furthermore be seen from FIG. 3, section B-B, section C-C and section D-D, metallic connection elements 13 are provided in the form of bolts or rivets which serve the fixed, shape-matched joining of the two shell structures 3, 4 and/or which serve the security against peeling to support a firmly bonded connection.

The sectional representations B-B and section C-C show the design of a flexurally stiff and corrosion stiff hollow structure by the shell components 3, 4, in which the central tube structure 2 is fixedly arranged.

Figure 4A:
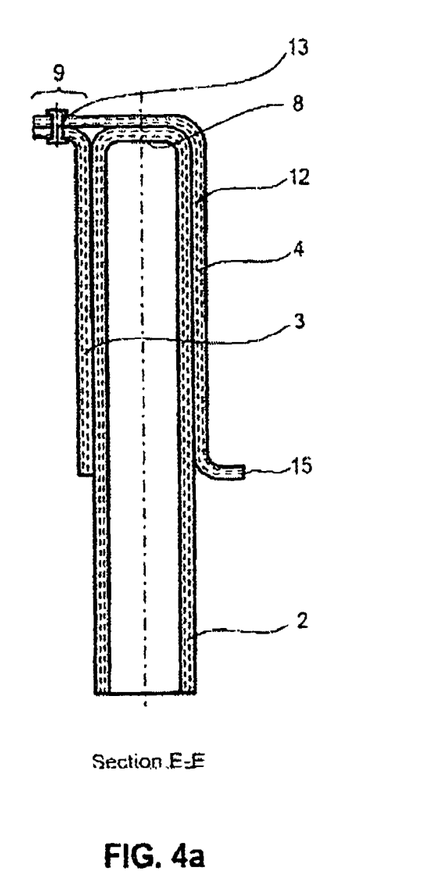
FIGS. 4a, 4b: longitudinal representations through the landing gear leg in different embodiments in accordance with the line E-E in FIG. 1, right hand representation.

FIG. 4a shows a longitudinal section through the landing gear leg 1 in accordance with FIG. 1, right hand representation, in accordance with the section line E-E. The cylindrical structure 2 which is clamped over a large length via the inner shell 3 and the outer shell 4, which is closed at the upper end 8 and which can thus absorb axial forces of the spring-damper system in a shape-matched manner can be seen from this embodiment. A textile reinforcement is shown by the reference numeral 12.

Figure 4B:
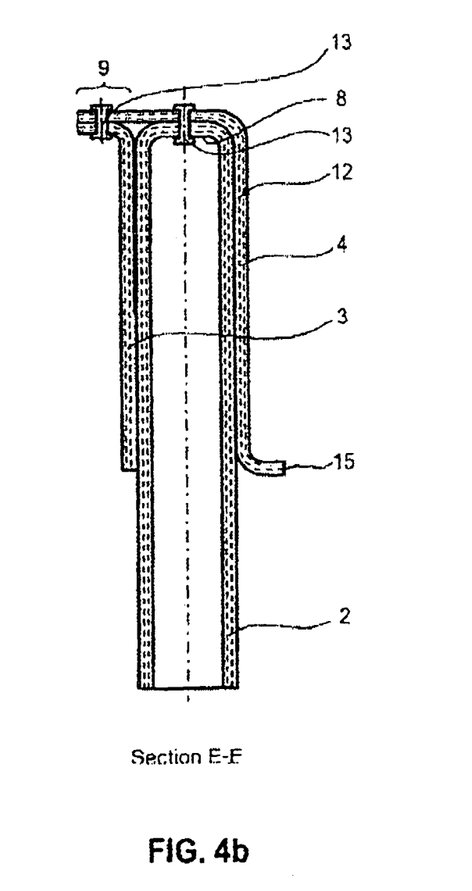

A connection of the inner shell and the outer shell 3, 4, by a biased metal bolt 13 also results from this representation in accordance with FIG. 4a. FIG. 4b shows an arrangement in accordance with FIG. 4a in which a further biased metal bolt 13 connects the upper closed end 8 of the tube 2 to the outer shell 4.

Figure 5:
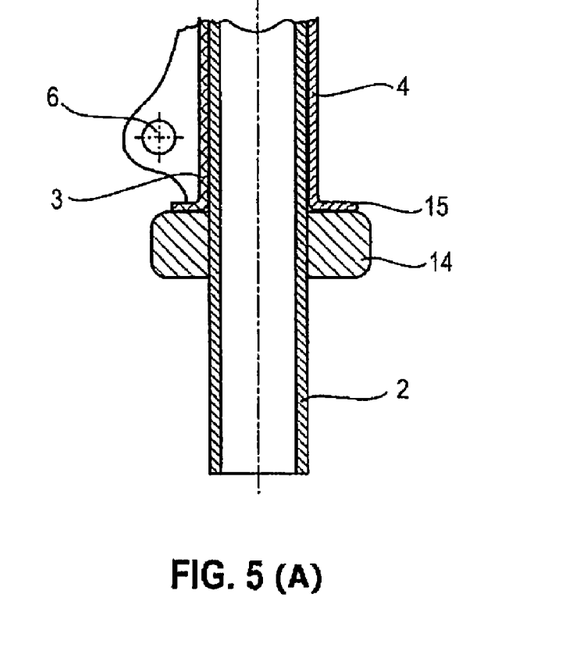
FIG. 5: a longitudinal representation of a section of the landing gear leg in accordance with the invention with a steering housing produced separately and integrally.

The integrated flange is indicated by the reference numeral 15 in FIGS. 4a, b by means of which the steering housing 14 is fixed, as can be seen in more detail from FIG. 5.

FIG. 5 shows, in its upper illustration, a first possibility of attaching the steering housing 14 with bow landing gear. In this case, it is made as a separate component and is installed at a flange 15 integrated into the outer shell 4. It is also conceivable to integrate the steering housing 14 into the outer shell as can be seen from FIG. 5, bottom illustration.

Further weight savings are achieved by the integration, with the effort and/or cost, however, increasing for the tool construction and the fiber composition production.

Figure 6:
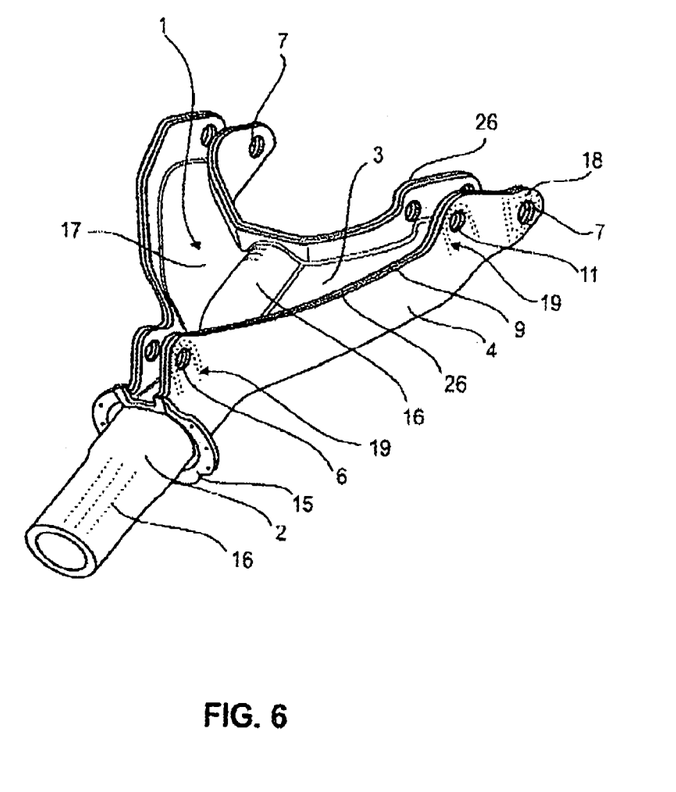
FIG. 6: a perspective representation of the landing gear leg in accordance with the invention with an indicated preferred orientation of the reinforcement fibers.

FIG. 6 shows the landing gear leg in accordance with the invention in a perspective representation. Fiber reinforcements with a fiber orientation suitable for strain are indicated by the reference numerals 16 and 17. Since the landing gear leg 1 is substantially exposed to a global bending strain, the reinforcement fibers are arranged for the achievement of a high degree of lightweight construction approximately parallel to the tube axis 16 and on a direct path between the load introduction points 17.

As can furthermore be seen from FIG. 6, a so-to-say isotropic layer construction 18 is of advantage in the surroundings of bolt connections subject to high strain to ensure a high hole reveal strength.

If bolt holes are provided which have a low spacing from the component rim, tolerable support forces can be increased with local loop arrangements 19. Reference numeral 26 shows component edges machined in a cutting process.

Figure 7:
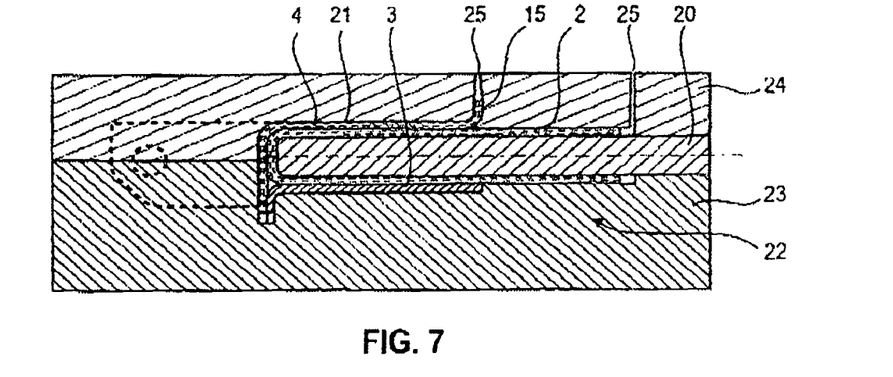
FIG. 7: a schematic sectional view of the landing gear leg of FIG. 1 in a closed molding tool.

FIG. 7 shows, in a schematic sectional representation, an arrangement for the production of a landing gear leg in the resin transfer molding—RTM—method. The molding tool 22 consists in accordance with FIG. 7 of an upper tool 24 and a lower tool 23 as well as of a core 20 which is inserted between both tools 23, 24. The core serves for the shaping of the central tube structure 2. Cores 20 of structured foam or cores which can be washed out are inserted for the definition of the spacing from the outer and inner shells 3, 4. Subsequently, the semi-finished reinforcement products for the outer shell 4 are aligned in the tool. Then the vacuum-tight closing and the evacuation of the molding tool take place for the consolidation of the still dry fiber structure between the upper and lower tools 23, 24. After the evacuation, reaction resin is injected via a system of sprue passages 25. A tempering of the tool enables the setting of a favorable viscosity as well as the removal of reaction heat.

In the RTM method, the textile semi-finished reinforcement products enclosed in the tool and preforms 21 are infiltrated with reaction resin via a sprue system 25 after the evacuation of the air.

Figure 8:
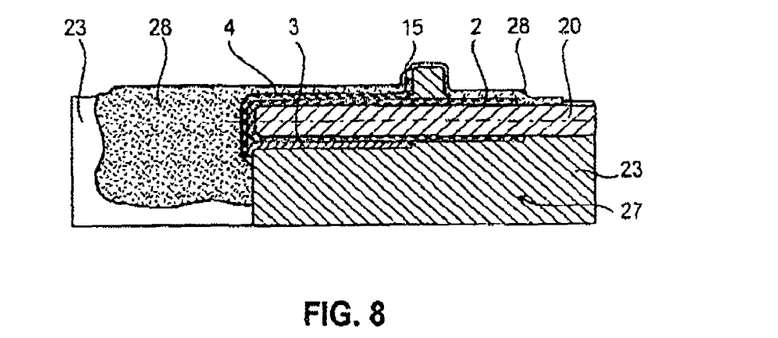
FIG. 8: a schematic sectional view of the landing gear leg of FIG. 1 in an open molding tool.

FIG. 8 shows an arrangement for the manufacture of the landing gear leg in an open molding tool system 27. In this process, the upper tool 24 is replaced by a vacuum foil 28. In this method, the compacting of the laminate takes place by increasing the process pressure, for instance in an autoclave, whereby higher fiber volume portions can be achieved. With such a tool system in accordance with FIG. 8, the processing of both dry and pre-impregnated tailored fibers is possible.

After the consolidation, the component is removed from the mold and finished in a cutting process in the region of the bosses.

Figure 9:
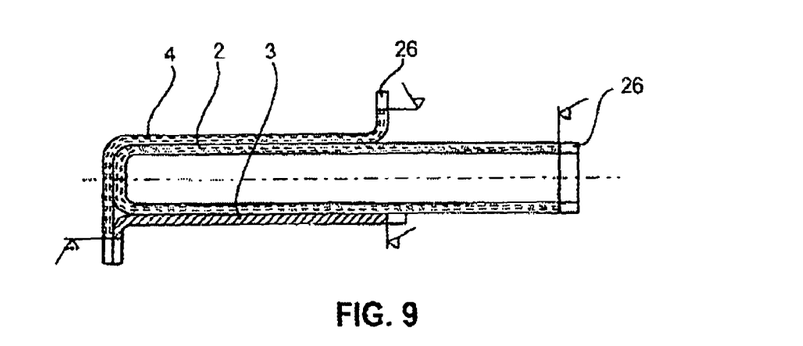
FIG. 9: a longitudinal sectional view of the landing gear leg of FIG. 1 after its manufacture with an illustration of the marginal zones to be machined in a cutting fashion.

FIG. 9 shows the contour of the component before and after the cutting edging with reference to a longitudinal section.

Figure 10:
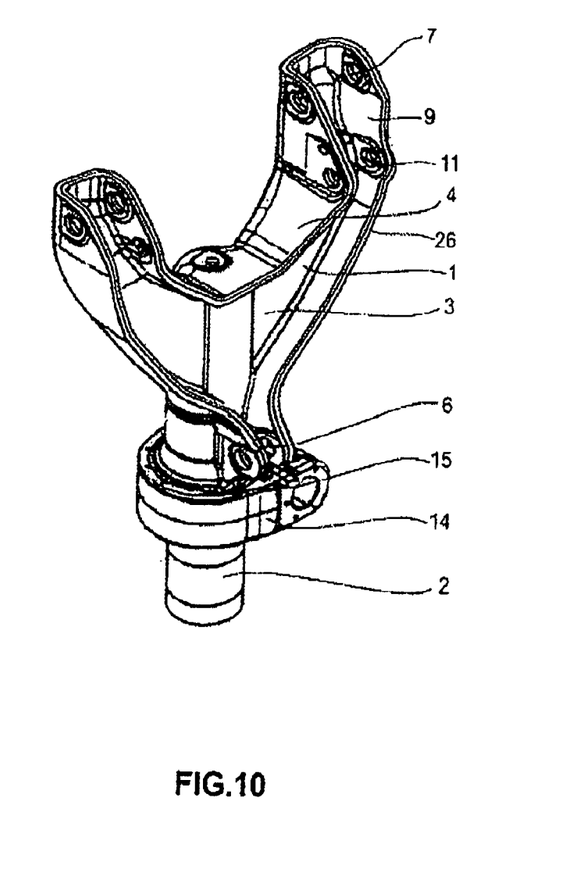
FIG. 10: a detailed perspective representation of the landing gear leg in accordance with the invention with a separate steering housing.

FIG. 10 again shows the landing gear leg 1 in accordance with the invention in a perspective representation with a separate steering housing 14 fixed to the flange 15.

Figure 11:
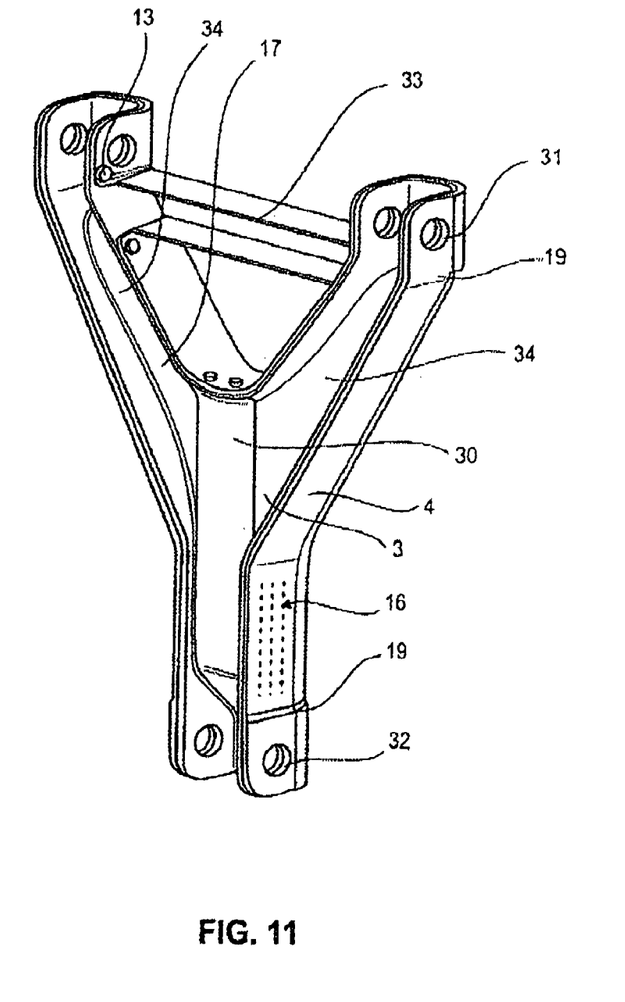
FIG. 11: a perspective representation of the upper kinked brace made from two shell structures.

FIG. 11 shows the upper kinked brace 30 in accordance with the invention in a perspective representation. The similarity of the outer design with the landing gear leg becomes clear with reference to FIG. 1, right hand representation, and FIG. 11.

The upper kinked brace 30 likewise consists of two shell structures 3, 4 which form a flexurally stiff hollow structure and which, like the landing gear leg, are fixedly connected to one another in a large area overlap region 9.

The upper kinked brace 30 is made in Y shape and has two branches 34 in whose end regions pivot bearings 31 are provided for the pivotable arrangement of the upper kinked brace at a fuselage structure of an aircraft. The branches are connected to one another underneath the bearing 31 via a brace 33. This brace or the web is formed as a U section of the outer shell 4 and prevents a lateral escape of the branches 34 on tractive strain or compressive strain.

Provision can also be made here for the connection stiffness to be increased again by local metallic connection elements 13 between the shell components 3, 4. As also with the landing gear leg 1, the metallic connection elements also serve as a security against peeling by supporting a shaped matched connection.

The bosses are arranged in the overlap region 9 of the shell structures, as is also the case with the landing gear leg 1, for the transmission of very high hole reveal forces. Since the brace component 30 is primarily strained in the longitudinal direction, the arrangement of the reinforcement fibers in the longitudinal direction or on a short and direct path between the load introduction points is of advantage. The preferred direction is indicated by reference numerals 16, 17 in FIG. 11. Reference numeral 19 marks the local fiber reinforcement with loop arrangement.

Figure 12:
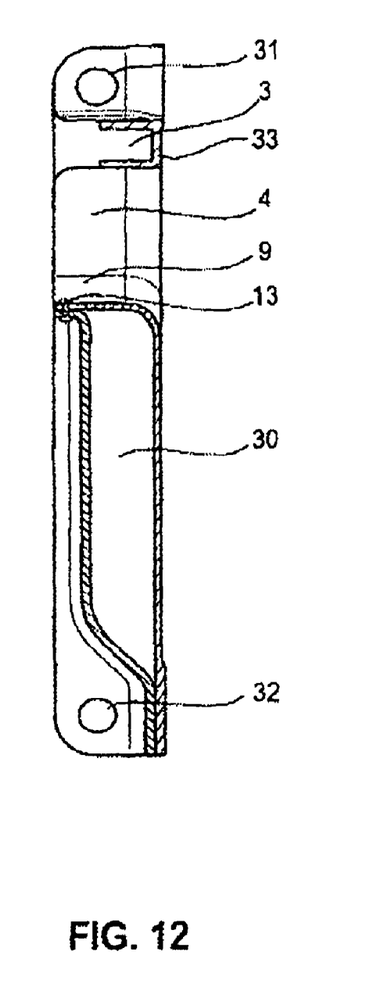
FIG. 12: a longitudinal sectional representation through the kinked brace of FIG. 11.

FIG. 12 shows the brace in accordance with FIG. 11 in a longitudinal sectional view. The arrangement of the pivot bearings 31 for the pivotal arrangement of the upper kinked brace 30 at a fuselage structure of an aircraft and the bearing bore 32 for the connection to the lower kinked brace become visible from this Figure, with the lower kinked brace preferably consisting of metal and establishing the connection between the upper kinked brace 30 and the landing gear leg 1.

It furthermore becomes visible from FIG. 12 that the two shell structures 3, 4, form a flexurally stiff hollow structure. In the region of the bosses 32, the shells are guided together to release sufficient construction space for the spherical bearings.

The following advantages of the aircraft landing gear in accordance with the invention can be named by way of example:

- substantial weight saving with respect to classical metallic manners of construction by use of heavy duty composite materials such as carbon fibers, for instance;
- high fatigue strength and docile failure behavior on overstrain, avoidance of crack propagation due to textile reinforcements with crack-stopper properties;
- good corrosion resistance of the fiber composite material;
- high technical manufacturing reproducibility by a simple design suitable for the material of the individual shells and tubular fiber composite structures;
- cost-savings due to adaptation depending on volumes of production and installation processes, low investment costs, in particular with low-volume production.

The invention claimed is:

1. An aircraft landing gear comprising
   a landing gear leg (1) composed partly or completely of fiber composite material,
   a brace (29, 30) connected to and supporting the landing gear leg (1) in extended state,
   at least part of at least one of the landing gear leg (1) and brace (29, 30) comprising at least two mutually connected shell structures (3,4) of fiber composite material, and
   the landing gear leg (1) having at least one tube structure (2), wherein
   the shell structures (3, 4) are connected to the tube structure (2) and preferably form a hollow structure in which the tube structure (2) is arranged.

2. An aircraft landing gear in accordance with claim 1, wherein the brace (29, 30) has at least two mutually pivotable parts (29, 30) of which one is fastened to the landing gear leg (1) and the other (29) fixable to aircraft fuselage and composed at least partly of fiber composite material.

3. An aircraft landing gear in accordance with claim 1, wherein the at least one tube structure (2) is arranged for reception of at least one of a spring-damper system thrust tube (5) at which a wheel axle assembly is arranged.

4. An aircraft landing gear in accordance with claim 1, wherein the shell structures (3, 4) and the tube structure (2) form a structural unit.

5. An aircraft landing gear in accordance with claim 1, wherein the landing gear leg (1) has one or more support points (6, 7) for fixing the landing gear leg (1) to at least one of a fuselage structure of an aircraft, the brace (29, 30) supporting the landing gear leg (1) and to an actuation unit (11) for moving the landing gear leg (1).

6. An aircraft landing gear in accordance with claim 1, wherein the brace (29, 30) has one or more support points (31, 32) for fixing the brace (29, 30) to at least one of a fuselage structure of an aircraft, the landing gear leg (1) and a further brace (29) and/or connecting two parts of the brace (29, 30) to one another.

7. An aircraft landing gear comprising
   a landing gear leg (1) composed partly or completely of fiber composite material,
   a brace (29, 30) connected to and supporting the landing gear leg (1) in extended state, and
   at least part of at least one of the landing gear leg (1) and brace (29, 30) comprising at least two mutually connected shell structures (3,4) of fiber composite material 5, wherein
   the shell structures (3, 4) overlap areally at least in part, preferably in marginal regions, while forming one or more overlap regions (9).

8. An aircraft landing gear comprising
   a landing gear leg (1) composed partly or completely of fiber composite material,
   the landing gear leg (1) having one or more support points (6, 7) for fixing the landing gear leg (1) to at least one of a fuselage structure of an aircraft, a brace (29, 30) supporting the landing pear leg (1) and an actuation unit (11) for moving the landing gear leg (1), and
   at least part of the landing gear leg (1) comprising at least two mutually connected shell structures 93,4) of fiber composite material, wherein
   the shell structures (3, 4) overlap areally at least in part, preferably in marginal regions, while forming one or more overlap regions (9), and
   one or more of the support points (6, 7, 31, 32) are arranged in the overlap region or regions (9).

9. An aircraft landing gear in accordance with claim 1, additionally comprising
   a steering housing (14) arranged at the landing gear leg (1) as a separate part or is integrated therein.

10. An aircraft landing gear comprising
    a landing gear leg (1) composed partly or completely of fiber composite material,
    a brace (29, 30) connected to and supporting the landing gear leg (1) in extended state,
    at least part of at least one of the landing gear (1) and brace (29, 30) comprising at least two mutually connected shell structures (3,4) of fiber composite material,
    a steering housing (14) arranged at the landing gear leg (1) as a separate part or is integrated therein, and
    a flange (15) to which the steering housing (14) is fastened and which forms an integral component of one of the shell structures (3,4).

11. An aircraft landing gear in accordance with claim 1, wherein the brace (29, 30) or a part (30) of the brace (29, 30) has a basic structure which is branched in a Y shape and having branches (34) in which support points (31, 32) for fixing of the brace (29, 30) to a fuselage structure of an aircraft are provided.

12. An aircraft landing gear in accordance with claim 11, additionally comprising at least one web (33) which extends between the branches (34) of the base structure branched in a Y shape.

13. An aircraft landing gear in accordance with claim 1, wherein the fiber composite material has long or endlessly extending reinforcement fibers (16, 17) such as glass fibers, aramide fibers or carbon fibers.

14. An aircraft landing gear in accordance with claim 13, wherein the fibers are embedded into a matrix, in particular to a matrix consisting of or comprising a thermosetting or thermoplastic material.

15. An aircraft landing gear in accordance with claim 1, wherein the fiber composite material has a plurality of layered textile areal semi-finished products (12), in particular woven fabrics, fabrics or knitted fabrics.

16. An aircraft landing gear in accordance with claim 7, additionally comprising connection elements (13) connecting the overlap regions (9), in particular biased metallic connection elements (13).

17. An aircraft landing gear in accordance with claim 16, wherein the landing gear leg (1) has at least one tube structure (2) for reception of at least one of a spring-damper system and thrust tube (5) at which a wheel axle assembly is arranged, and
    the connection elements (13) are arranged in at least one of upper and lower clamping regions of the central tube structure (2) and a region of support points (6, 7, 31, 32), by which at least one of the aircraft landing gear leg (1) and brace (30) is fixed to a fuselage structure of an aircraft.

18. An aircraft landing gear in accordance with claim 13, wherein at least some of the reinforcement fibers (16, 17) extend approximately parallel to at least one of an axis of the tube structure (2) and path between load introduction points.

19. An aircraft landing gear in accordance with claim 8, wherein an isotropic design or a local thickening of the fiber composite material is present at least in one of a region of one of the support points (3, 4, 31, 32) and branching of the brace (29, 30) made in a Y shape.

20. An aircraft landing gear in accordance with claim 1, wherein components of at least one of the landing gear leg (1) and brace (29, 30) are joined to one another by a connection technique, in particular by adhesive bonding or riveting, or are manufactured together in a production step.

21. A method for the manufacture of at least one of a landing gear leg (1), brace (29 30) for the landing gear leg (1) and parts thereof for an aircraft landing gear, comprising the steps of
    manufacturing by resin transfer molding,
    at least part of at least one of the landing gear leg (1) and brace (29, 30) comprising at least two mutually connected shell structures (3, 4) of a fiber composite material;
    first placing a tailored fiber (21) for a first shell structure (3) on a lower tool (23);
    then positioning a winding core (20) provided with the fiber material for a tube structure (2) in the molding tool; and
    then positioning a tailored fiber for the further shell structure (4).

22. A method in accordance with claim 21, comprising the additional steps of
    first positioning dry or preconsolidated semi-finished reinforcement products or preforms in the molding tool;
    then evacuating the molding tool; and
    subsequently pressing reaction resin into the shaping tool.

23. A method in accordance with claim 21, comprising the additional step of first placing the fiber material of the tube structure (2) on a core in a technical winding manner.

24. A method in accordance with claim 21, wherein the fiber material for a tube structure (2) is impregnated with resin before introduction into the molding tool and preferably before technical winding placement of the fiber material of the core (20).

25. A method in accordance with claim 21, wherein the molding tool comprises a lower tool and an upper tool or a lower tool and a vacuum foil.

* * * * *